3,341,581
MANUFACTURE OF MONOFLUOROACETYL FLUORIDE

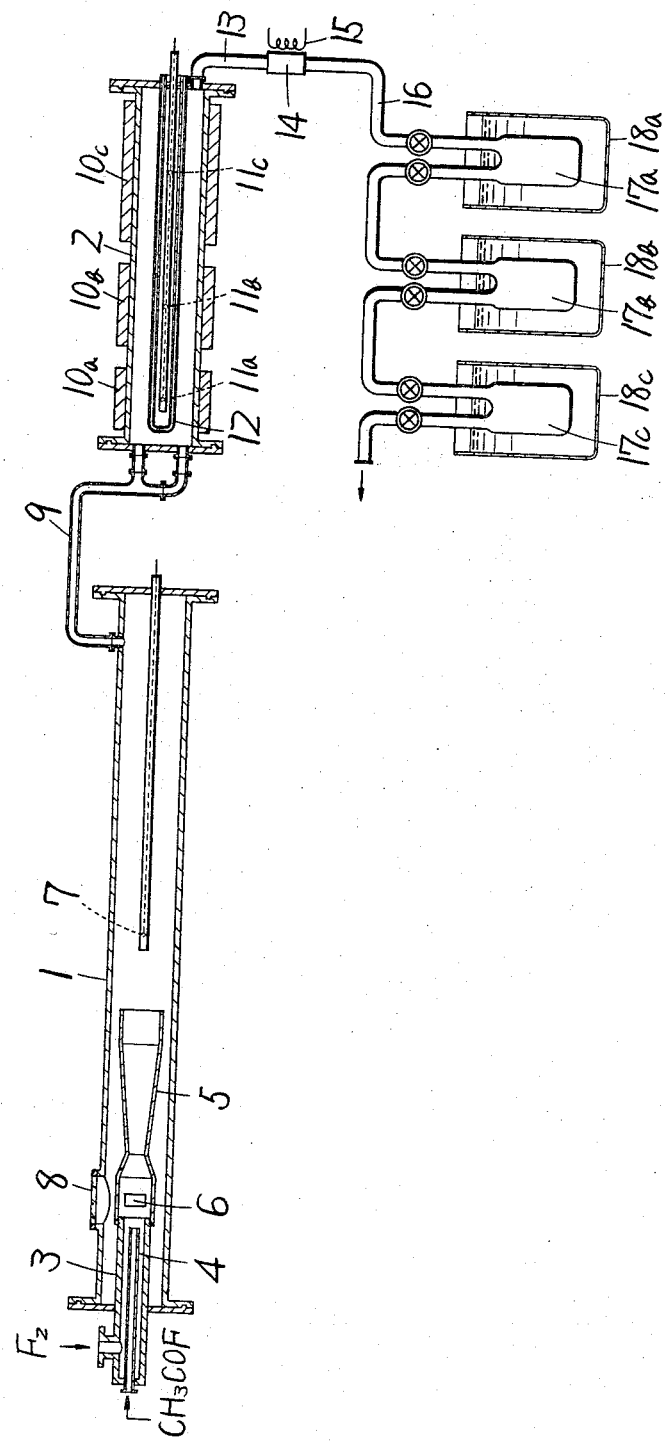

Kaoru Kato, Toyonaka-shi, and Tooru Akiyama, Osaka-fu, Japan, assignors to Daikin Kogyo Kabushiki Kaisha, Osaka-shi, Japan
Filed Mar. 15, 1965, Ser. No. 439,585
Claims priority, application Japan, Mar. 18, 1964, 39/15,132
6 Claims. (Cl. 260—544)

This invention relates to a process for manufacturing monofluoroacetyl fluoride, and particularly to an improved process for manufacturing monofluoroacetyl fluoride by the vapor phase reaction of acetyl fluoride with fluorine.

It is known that the vapor phase fluorination of organic compounds with fluorine is very difficult to control due to the vigorous reaction and the vast heat of reaction, followed by explosion, and produces combustion products and perfluoro compounds such as carbon tetrafluoride. Accordingly it is a usual process to use a large amount of nitrogen or similar inert gas as diluent or to use a metal-packed reactor. Partially-fluorinated compounds are difficult to obtain by this fluorination with fluorine.

Monofluoroacetyl fluoride is a valuable compound, particularly for intermediates for agricultural chemicals and the like.

It was reported in the issue of J. Amer. Chem. Soc. 70, 2602 (1948) that the vapor phase reaction of acetyl fluoride with fluorine in the presence of a copper catalyst, where nitrogen was used as diluent, was carried out, producing monofluoroacetyl fluoride in low yield.

The employment of a large amount of diluting gas, however, has disadvantages that it requires uneconomical processes for separating the monofluoroacetyl fluoride from the diluent gas and it gives the low yield of monofluoroacetyl fluoride owing to the large formation of undesirable by-products such as difluoroacetyl fluoride and trifluoroacetyl fluoride.

An object of this invention is accordingly to provide a process for fluorinating acetyl fluoride with fluorine without employing any inert gas to obtain monofluoroacetyl fluoride.

Another object of this invention is to provide a process for the vapor-phase reaction of acetyl fluoride with fluorine to obtain monofluoroacetyl fluoride without employing any inert gas, which can be economically employed for industrial uses.

A further object of this invention is to provide a process for manufacturing monofluoroacetyl fluoride in which is dispensed with the procedure for separating the inert gas from the reaction products.

Still another object of this invention is to provide a process for fluorinating acetyl fluoride in which the vigorous reaction and the temperature can be controlled easily, and free from explosion.

A still further object of this invention is to provide a process for effecting substantially complete utilization of fluorine which is a relatively expensive material.

A specific object of this invention is to provide a process for manufacturing monofluoroacetyl fluoride in high yields, minimizing the combustion loss of the starting acetyl fluoride.

Another specific object of this invention is to provide a process for selectively manufacturing monofluoroacetyl fluoride, decreasing the amount of by-produced difluoroacetyl fluoride or trifluoroacetyl fluoride.

The other objects and advantages of this invention will be apparent hereinafter.

The above objects have been accomplished according to the present invention by employing a large excess of acetyl fluoride in the absence of any diluting gas for the vapor phase reaction of acetyl fluoride with fluorine to produce monofluoroacetyl fluoride.

The present invention is based on the discoveries that by employing acetyl fluoride in large excess amount, the fluorination reaction is controlled and the temperature remains constant without employing any diluent, minimizing the combustion loss of the starting acetyl fluoride, and monofluoroacetyl fluoride can be obtained selectively in excellent yields with almost no by-products such as di- or tri-fluoroacetyl fluoride.

According to this invention it is essential to employ acetyl fluoride in the order of not less than 3 moles on the basis of 1 mole of fluorine. With lesser amount than 3 moles of the former, it is difficult to control the reaction and the reaction temperature, and the objects of this invention cannot be attained. The desirable amount of acetyl fluoride is in the range of from 3 to 9 moles, most desirably 5 to 8 moles, on the basis of 1 mole of fluorine within which monofluoroacetyl fluoride can be obtained in high yields. Larger amounts of acetyl fluoride may be employed, where necessary, although it is accompanied by some disadvantages in the economical and industrial points of view.

Acetyl fluoride, B.P. 20° to 21° C., to be employed as the starting material is prepared by the reaction of acetic acid anhydride with hydrogen fluoride or potassium bifluoride, or of acetyl chloride with potassium fluoride.

The vapor phase fluorination of acetyl fluoride is carried out at a temperature ranging between 20° C., being the boiling point of acetyl fluoride and 300° C. or thereabout. A temperature above 300° C. may increase the danger of explosion, and the range of from 60° to 100° C. is most desirable. At a temperature between 20° C. and 40° C. or thereabout, the reaction also takes place, but it is ordinarily too low for practical operation. It is generally desired that fluorine and acetyl fluoride is prereacted at 20° to 40° C. to mix thoroughly and then the mixture is heated to a temperature of from 40° to 300° C., particularly from 60° to 120° C., to carry out the reaction.

The contact time is not critical in this invention, and it may be freely selected among a wide range depending on various reaction factors, such as the reaction temperature, the mixing ratio of acetyl fluoride and fluorine, and the reaction apparatus. It may be, for instance, as short as 1 second and in some cases may be 120 seconds. Generally, 3 to 50 seconds or thereabout is suitable.

In this invention a high order of yield of monofluoroacetyl fluoride is ensured without employing any catalyst, so that in working this invention no catalyst is required. If desired, however, there may be employed such a conventional catalyst as copper without adverse effect.

Besides the desired monofluoroacetyl fluoride, the gaseous product from the reactor contains unreacted acetyl fluoride, fluorine, by-produced hydrogen fluoride and slight amount or trace of difluoroacetyl fluoride, and contains no trifluoroacetyl fluoride. The desired monofluoroacetyl fluoride is easily separated from said product in accordance with known processes, such as condensation and distillation. The by-produced hydrogen fluoride is removed by passing said gaseous product through a tube charged with said sodium fluoride pellets or washing with fluorosulfonic acid before or after the condensation.

The unreacted acetyl fluoride is easily recycled to fluorination. Almost none of fluorine is found in the non-condensable gas from condensation process, since the fluorine reacts almost completely.

For the better understanding of this invention one example of the apparatus to be employed in working this invention is explained below in accordance with the accompanying drawing.

The apparatus illustrated is equipped with a primary reactor 1, a secondary reactor 2 and accessory parts all of which are made of non-corrosive metal such as copper, nickel, iron, Monel, etc. The primary reactor 1 is of Monel, 52.9 mm. inner diameter, and 600 mm. long and at the front part thereof are provided concentric double tubes 3 and 4 to feed fluorine and acetyl fluoride respectively. The outer tube 3, 28 mm. outer diameter and 16.3 mm. inner diameter is used to feed fluorine and the inner tube 4, 7.4 mm. outer diameter and 4 mm. inner diameter feeds acetyl fluoride. These feed tubes, 3 and 4 are connected with cylinders containing the starting gas respectively by means of iron pipe fitted with a flow-meter (not shown). Within the primary reactor 1 a venturi 5 of Monel is screwed on the feed tube 3. At the front of the venturi 5 are provided a few openings 6 to facilitate through mixing of the starting gases. 7 is a thermocouple, inserted in the primary reactor 1, and 8 is a peep-hole of polytrifluorochloroethylene resin for the reactor 1. The rear part of the reactor 1 is connected to the front part of the secondary reactor 2 with iron pipe 9 to lead the mixed gas. The secondary reactor 2 is made of iron, 52.9 mm. inner diameter and 300 mm. long and is heated from outside. The heating element consists of three electric heaters, 10a, 10b and 10c. The heaters are controlled respectively by means of the corresponding thermocouples 11a, 11b and 11c inserted in the secondary reactor 2. Within the reactor 2 is further provided a tube 12 for feeding a cooling medium such as air, and at the rear part of the reactor 2 is provided an iron pipe 13 to lead the gaseous product. The pipe 13 is connected with a tube 14 charged with sodium fluoride pellets and can be heated from outside with an electric heater 15. The tube 14 is further connected with iron pipe 16 and cold traps, 17a, 17b and 17c which are chilled from outside by Dry Ice-trichloroethylene baths 18a, 18b and 18c respectively. This unit can further be connected with an evaporating apparatus (not shown).

The arrangement as described above is one desirable for working this invention but does not limit the working of this invention to this apparatus. For instance, instead of providing the primary and secondary reactors separately, either a single reactor may be adopted which consists of the front part to feed the starting materials and the rear part to carry out reaction, or altering the construction by providing multi-tube system in the secondary reactor, etc. The sizes and materials of the primary and secondary reactors and accessory parts thereof can naturally be altered freely and as required. Further, the separation of gaseous product from the secondary reactor is not an important process in this invention, and any apparatus suitable other than illustrated herein can be employed in place.

The working examples are given below which are illustrative only and do not limit the scope of this invention, in which the afore-illustrated reaction apparatus is employed.

Example 1

The acetyl fluoride charged in the cylinder was heated and vaporized at 50° C. and led to the feed tube 4 through an iron pipe fitted with a flow-meter. The fluorine gas in the other cylinder was led to the feed tube 3 through an iron pipe fitted with a flow-meter. The flow rates should be: acetyl fluoride at 772 milliliters/min. and fluorine gas at 100 milliliters/min., thus in the molar ratio of 7.72:1. The gases were introduced into the primary reactor 1 maintained at 20° C. through the feed tubes 3 and 4 respectively, and were mixed by means of venturi 5. The mixed gas was led to the secondary reactor 2 the temperature wherein was maintained at 100° C. through the iron pipe 9 and reacted by a contact for 36 seconds, and the resultant gaseous product was led out from the secondary reactor 2 through the iron pipe 13. The cooling by the tube 12 was unnecessary. The gaseous product from the pipe 13 was led to the sodium fluoride pellet tube 14 heated to 70° C. where the byproduct, hydrogen fluoride was removed, then the gas was led to the three Monel cold traps, 17a, 17b and 17c which were chilled to −70° C. in Dry Ice-trichloroethylene baths, 18a, 18b and 18c respectively where the fluorinated and unreacted acetyl fluorides were condensed, and the unreacted fluorine was removed as non-condensable gas.

Through the above process there were obtained 218 grams of the condensate. To 10 grams of the product were added 20 grams of methanol at Dry Ice-trichloroethylene temperature (−70° C.), and allowed to warm up to a room temperature of from 20° to 25° C. and stand for 12 hours, producing methyl esters to facilitate the analysis, and further added 10 grams of pulverized sodium fluoride to remove hydrogen fluoride.

The number of moles of the products per mole of fluorine fed, determined by gas chromatography are as follows:

$CH_2FCOOCH_3$ ———————————————— 0.810
$CHF_2COOCH_3$ ———————————————— 0.040
$CF_3COOCH_3$ ———————————————— 0.000

Examples 2–11

Another series of runs were done employing the reaction apparatus of Example 1 in which the mole ratio of acetyl fluoride and fluorine, the temperature and contact time in secondary reactor 2 were varied as specified in the following table. Other reaction conditions were identical to those employed in Example 1.

The results of the analysis are given below. The yields of the product are shown by the number of moles of the resultant product per mole of fluorine fed.

In the table below, are also included the results of control 1, 2 and 3 for comparison in which less than 3 moles of acetyl fluoride per mole of fluorine were employed.

| Example No. | Reaction conditions | | | | Yield of Product (mole/mole-$F_2$) | | |
|---|---|---|---|---|---|---|---|
| | $CH_3COF/F_2$ (molar ratio) | $N_2/F_2$ (molar ratio) | Reacting Temperature (° C.) | Contact Time (seconds) | $CH_2FCOF$ | $CHF_2COF$ | $CF_3COF$ |
| 2 | 3.84 | 0 | 130 | 62 | 0.278 | 0.0308 | 0 |
| 3 | 4.62 | 0 | 100 | 55 | 0.337 | 0.0143 | 0 |
| 4 | 5.20 | 0 | 100 | 50 | 0.546 | 0.0275 | 0 |
| 5 | 5.71 | 0 | 70 | 47 | 0.752 | 0.038 | 0 |
| 6 | 6.18 | 0 | 100 | 43 | 0.92 | 0.032 | 0 |
| 7 | 7.36 | 0 | 100 | 37 | 0.756 | 0.045 | 0 |
| 8 | 7.43 | 0 | 70 | 36 | 0.748 | 0.0461 | 0 |
| 9 | 7.40 | 0 | 70 | 36 | 0.722 | 0.0461 | 0 |
| 10 | 8.05 | 0 | 100 | 34 | 0.772 | 0.0360 | 0 |
| 11 | 8.78 | 0 | 300 | 31 | 0.296 | 0 | 0 |
| Control: | | | | | | | |
| 1 | 1.27 | 0 | 130 | 63 | 0.0887 | 0.0060 | 0 |
| 2 | 1.76 | 4 | 130 | 46 | 0.0128 | 0 | 0 |
| 3 | 1.20 | 20 | 130 | 22 | 0.243 | 0.116 | 0 |

From the above results it has been found that in the Control 1, the employment of approximately equivalent amounts of acetyl fluoride and fluorine without employing diluent resulted in an extremely low yield of monofluoroacetyl fluoride compared with the Examples 2–11 of this invention, and some mild explosions occurred during the reaction. In the Control 2, almost equivalent amounts of fluorine and acetyl fluoride were diluted with 4 times mole of nitrogen gas and the yield therefrom of monofluoroacetyl fluoride was also extremely low. Further, in Control 3, where 20 times mole of nitrogen gas was employed as diluent, the low yield of monofluoroacetyl fluoride was obtained with the relatively high yield of the by-product, difluoroacetyl fluoride, and further in Controls 2 and 3, the chilling efficiency was lowered due to the presence of nitrogen gas, and perfect condensation could not be obtained by the illustrated apparatus, necessitating further provision of cold traps chilled to −180° C. by liquid oxygen baths.

According to this invention employing more than 3 moles of acetyl fluoride on the basis of 1 mole of fluorine, without employing any diluent the reaction is properly controlled without the danger of any explosion, giving a high yield of monofluoroacetyl fluoride and minimizing the by-product such as di- or tri-fluoroacetyl fluoride, and the desired monofluoroacetyl fluoride can be produced selectively in high yield, the utilization of fluorine being substantially complete. As no inert gas has to be employed it exhibits high efficiency of condensation, dispensing with the separation of inert gas, thus simplifying the apparatus and operation.

This invention should not be limited by the above description, and can be varied in different manners within the scope of the appended claims.

We claim:
1. A process for manufacturing monofluoroacetyl fluoride comprising contacting acetyl fluoride with fluorine in the ratio of at least 3 moles of acetyl fluoride on the basis of 1 mole of fluorine in gas phase at a temperature of from 20° to 300° C.
2. The process of claim 1, in which from 5 to 8 moles of acetyl fluoride on the basis of 1 mole of fluorine are employed.
3. The process of claim 1, in which the temperature is from 60° to 120° C.
4. The process of claim 1, in which acetyl fluoride is premixed with fluorine at a temperature of from 20° to 40° C. in the ratio of at least 3 moles of acetyl fluoride on the basis of 1 mole of fluorine, followed by reaction at a temperature of from 40° to 300° C.
5. The process of claim 4 in which acetyl fluoride in the ratio of from 5 to 8 moles on the basis of 1 mole of fluorine is employed.
6. The process of claim 4, in which the reaction temperature is from 60° to 120° C.

References Cited

Stacey et al.: "Advances in Fluorine Chemistry," vol. 2 (1961), pp. 133–134.

LORRAINE A. WEINBERGER, *Primary Examiner.*

RICHARD K. JACKSON, *Assistant Examiner.*